(12) United States Patent
Patel

(10) Patent No.: US 11,249,986 B2
(45) Date of Patent: Feb. 15, 2022

(54) MANAGING STALE CONNECTIONS IN A DISTRIBUTED SYSTEM

(71) Applicant: PayPal, Inc., San Jose, CA (US)

(72) Inventor: Jaykumar Patel, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 107 days.

(21) Appl. No.: 16/717,701

(22) Filed: Dec. 17, 2019

(65) Prior Publication Data

US 2021/0182276 A1 Jun. 17, 2021

(51) Int. Cl.
| | | |
|---|---|---|
| G06F 15/16 | (2006.01) | |
| G06F 16/23 | (2019.01) | |
| G06F 16/27 | (2019.01) | |
| H04L 29/08 | (2006.01) | |
| H04L 12/861 | (2013.01) | |

(52) U.S. Cl.
CPC .......... *G06F 16/2379* (2019.01); *G06F 16/27* (2019.01); *H04L 49/90* (2013.01); *H04L 67/10* (2013.01); *H04L 67/141* (2013.01)

(58) Field of Classification Search
CPC ..... G06F 16/2379; G06F 16/27; H04L 49/90; H04L 67/10; H04L 67/141
See application file for complete search history.

(56) References Cited

U.S. PATENT DOCUMENTS

| | | | | |
|---|---|---|---|---|
| 6,834,305 B1 * | 12/2004 | Haynes | ................... | H04L 67/14 709/200 |
| 7,668,186 B1 * | 2/2010 | Nelson, IV | ............. | H04L 49/90 370/412 |
| 7,702,796 B2 | 4/2010 | Shen et al. | | |
| 8,271,659 B2 | 9/2012 | Irudayaraj et al. | | |
| 8,793,343 B1 * | 7/2014 | Sorenson, III | ........ | G06F 16/183 709/219 |
| 9,880,933 B1 * | 1/2018 | Gupta | ................. | G06F 12/0815 |
| 10,389,652 B2 | 8/2019 | Dick et al. | | |
| 2006/0212531 A1 * | 9/2006 | Kikkawa | ................. | H04L 65/80 709/217 |
| 2006/0288071 A1 * | 12/2006 | Bigioi | ................. | H04L 12/2803 709/203 |
| 2007/0268910 A1 * | 11/2007 | Shen | ...................... | H04L 69/40 370/395.21 |
| 2008/0320151 A1 * | 12/2008 | McCanne | ........... | H04L 67/2842 709/228 |

(Continued)

*Primary Examiner* — Razu A Miah

(74) *Attorney, Agent, or Firm* — Haynes and Boone, LLP

(57) ABSTRACT

A system performs operations that include receiving a database request to access, via a first connection in a connection pool, information stored in a database of the system. The first connection is associated with a physical connection layer and one or more logical connection layers. The physical connection layer points to a first network socket. Additionally, the operations include storing metadata associated with the one or more logical connection layers in a buffer. The operations further include responsive to determining that the first connection has been terminated and while maintaining the one or more logical layers, modifying the physical connection layer to point to a second network socket that is different from the first network socket. The operations also include subsequent to the modifying, processing the database request via the first connection based on the metadata stored in the buffer.

20 Claims, 7 Drawing Sheets

(56) References Cited

U.S. PATENT DOCUMENTS

| | | | | |
|---|---|---|---|---|
| 2010/0058455 A1* | 3/2010 | Irudayaraj | ............... | H04L 63/20 |
| | | | | 726/11 |
| 2013/0060909 A1* | 3/2013 | Bohm | ................. | H04L 67/1008 |
| | | | | 709/219 |
| 2014/0304306 A1* | 10/2014 | Proctor | ................. | G06F 16/217 |
| | | | | 707/803 |
| 2015/0081925 A1* | 3/2015 | Mapp | ....................... | H04L 49/90 |
| | | | | 709/232 |
| 2015/0358421 A1* | 12/2015 | Gupta | ................... | H04L 67/288 |
| | | | | 709/202 |
| 2016/0110771 A1* | 4/2016 | Klein | ................. | G06Q 30/0273 |
| | | | | 705/14.39 |
| 2016/0182401 A1* | 6/2016 | Dick | .................... | H04L 47/803 |
| | | | | 709/226 |
| 2016/0255139 A1* | 9/2016 | Rathod | ................ | H04L 51/046 |
| | | | | 709/203 |
| 2018/0157752 A1* | 6/2018 | Arikatla | ................ | G06F 16/182 |

* cited by examiner

MANAGING STALE CONNECTIONS IN A DISTRIBUTED SYSTEM

BACKGROUND

Technical Field

This disclosure relates generally to database systems and, more specifically, to managing stale connections in a distributed system.

Description of the Related Art

Connection pools are used to facilitate access to distributed systems, such as some database systems, by various applications. As such, when an application accesses the database system, the application selects an available database connection from the connection pool to connect to the database system. Subsequently, when the database operation(s) initiated by the application is complete, the selected database connection is returned back to the connection pool where it is available to be used for another connection to the database system.

In certain instances, before an application is able to transmit a request to the database system via a connection from the connection pool, the connection may be terminated, such as by a database proxy. A database proxy facilitates applications' access to connections in the connection pool, and therefore by extension access to the database system. This may result in unwanted errors being transmitted to the application and may degrade the experience of the end user of the application.

Figure 1:
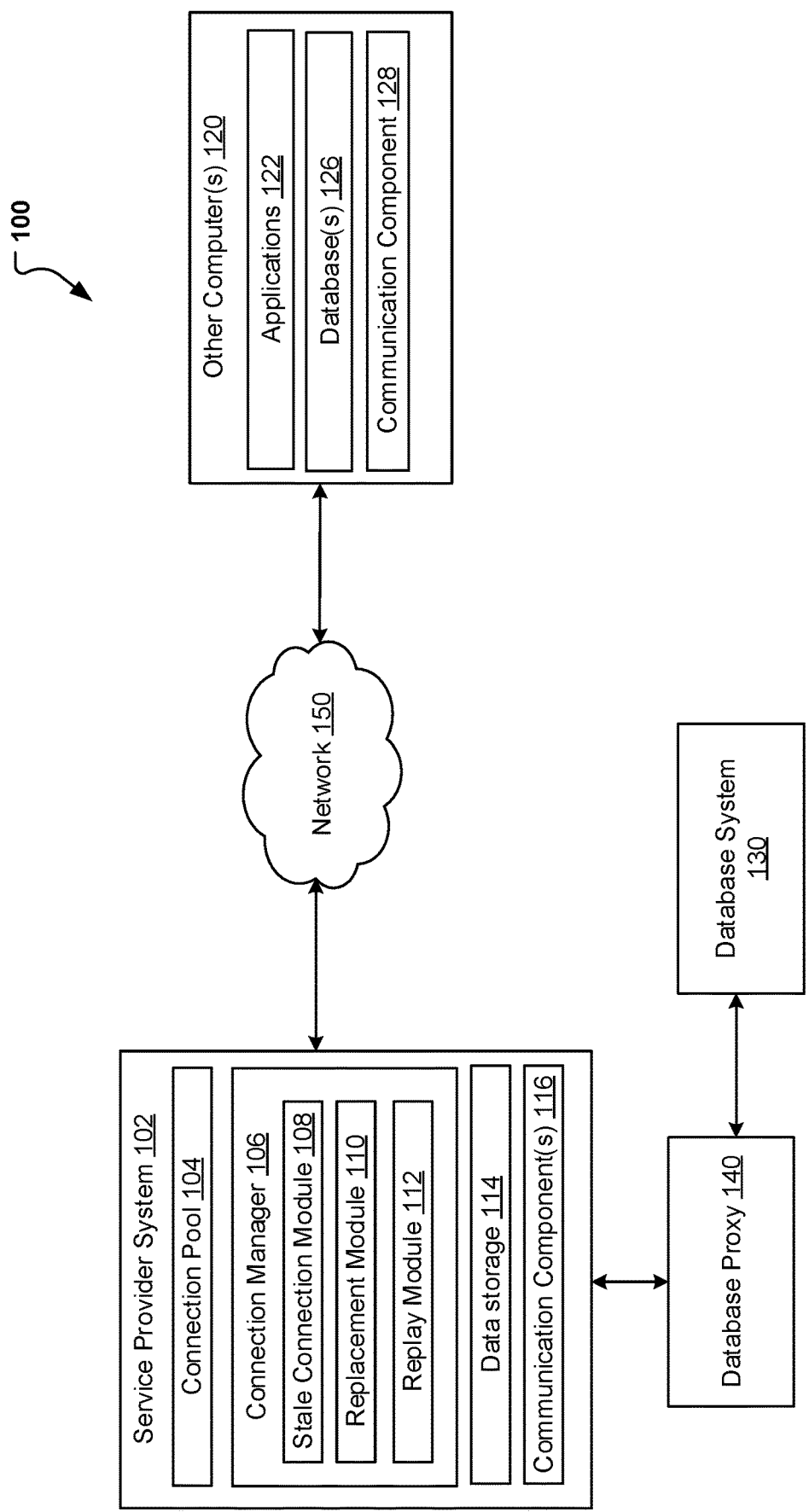
FIG. 1 is a block diagram illustrating an example system for managing stale connections in a distributed system, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "short-term module configured to determine connection usage value over a first time period" is intended to cover, for example, a device that performs this function during operation, even if the corresponding device is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112 (f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the term "processing element" refers to various elements configured to execute program instructions (or portions thereof or combinations thereof). Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

DETAILED DESCRIPTION

Techniques are disclosed for an algorithm for managing stale connections in a distributed system. The distributed system may be maintained by a service provider and may include one or more service provider servers and a database system. In certain embodiments, a service provider server maintained by the service provider may interface with applications to facilitate various transactions with the applications. The service provider may also maintain a database system that is configured to maintain a connection pool to facilitate database connections to a data source. Additionally, a database proxy may be configured to regulate connectivity between applications and specific connections from the connection pool.

In the course of communication between an application and the service provider server, the application may transmit a connection request to access information stored by the database system. As previously discussed, in certain cases, the application may attempt to transmit this connection request via a connection from the connection pool that the database proxy has already previously terminated. Such a connection may be referred to herein as a "stale connection." As a result of the stale connection, the database proxy typically transmits an end-of-stream (EOS) indication as a response to the application's request. The EOS causes an error message to be transmitted to the application and the transaction. Such errors create inefficiencies in the system and degrade user experience on the front-end. In the context of a payment provider, these errors may cause payment transactions to fail, thereby resulting in a loss of money, time, resources, and user dissatisfaction.

Some systems attempt to address the issue of stale connections by maintaining a dedicated thread that periodically checks each active connection in the connection pool for staleness (e.g., whether the connections have already been terminated). The dedicated thread performs these checks at a designated interval (e.g., every minute). If the dedicated thread detects that a particular connection is stale, a new connection for the application is generated and/or provided. However, such thread can create extra load on servers by consuming additional resources (e.g., processing cycles, memory, and/or the like). Further, stale connections can still produce errors in between the checks at the designated intervals.

Other systems may address stale connections by transmitting a dummy ping request to the database proxy before every instance in which an application attempts to use a connection. Each dummy ping request checks to determine whether the connection is stale, and if so, a new connection for the application is created and/or provided. However, this method creates additional latency in responding to application requests.

According to various embodiments, the service provider computer may include a connection manager to manage stale connections. The connection manager monitors connection requests transmitted to the database proxy. If the connection manager detects a stale connection, the connection manager is configured to perform certain remedial actions. In particular, the connection manager generates a connection buffer for every connection request transmitted to the database proxy. Each connection includes multiple logical layers and a physical layer. The logical layers may store state information about the connection request, a transaction associated with the connection request, and/or other pertinent information. The physical layer corresponds to a socket connection and may indicate and/or point to a particular network socket (e.g., Internet Protocol address, port number, and/or any other networking identifier) of a particular server, computer, or other networking device. As such, the connection manager may be configured to store data corresponding to the state information of the one or more logical layers.

The connection manager determines that a connection corresponding to a connection request is stale if the database proxy provides an EOS indication in response to the connection request. Otherwise, normal responses to connection requests are transmitted back to their respective applications without any interference from the connection manager. In the case of a stale connection, rather than generating a new connection and re-creating its logical layers, the connection manager is configured to modify the physical layer of the stale connection to point to a new network socket. Further, the connection manager is configured to "replay" certain operations according to the data stored in the connection buffer corresponding to the connection request. That is, the connection manager causes the database system to perform one or more operations indicated by the data stored in the connection buffer.

Thus, the one or more logical layers of the connection remain modified and only the physical layer is modified. Further, the connection manager only performs its functions in relation to stale connections, thereby preventing the connection manager from using computing resources with respect to connections that are operating normally (e.g., that are not stale).

FIG. 1 is a block diagram illustrating an example system 100 for managing stale connections in a distributed system. In the illustrated embodiment, the system 100 includes a service provider system 102 in communication with other computer(s) 120 via a network 150. The service provider system 102 is also in communication with a database system 130 and a database proxy 140. It will be appreciated that while FIG. 1 depicts database system 130, in other embodiments, the database system may be any other type of computer system, including a distributed computer system. Furthermore, the service provider system 102 may also be a distributed computer system. The service provider system 102 is maintained by a service provider. In certain embodiments, the service provider is a payment service provider, but it will be appreciated that any type of service provider is also possible.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

In FIG. 1, service provider system 102 may include a connection pool 104, a connection manager 106, a data source 114, and communication components 116. The connection manager 106 may include a stale connection module 108, a replacement module 110, and a replay module 112. Each of the components of the service provider system 102 may communicate with each other to managing stale connections in a distributed system, as will be described in more detail below.

The connection pool 104 represents a group of database connections (e.g., socket connections used to connect to the database system 130) that can be shared among various applications (e.g., such as applications 122 from other computers 120) requesting to access the service provider system 102 and/or the database system 130. For instance, a digital transaction between an application and the service provider system 102 may be initiated at some point in time. As part of the digital transaction, various communications between the application and the service provider system 102 may be transmitted. Further, each time an application transmits a communication to the service provider system 102 that results in a need to perform a database operation with respect to the database system 130, a connection request to access the database system 130 using a connection from the connection pool 104 may be generated. According to some embodiments, the connection request may be generated by the service provider system 102 and provided to the database proxy 140. In other embodiments, the connection request may be included in the communication between the application and the service provider system 102, and the service provider system 102 may forward the connection request to the database proxy 140.

The database proxy 140 is configured to provide a response to the connection request. In normal operation, the database proxy 140 responds to the connection request with the information from the database system 130 that was initially requested by the application. In situations where the database proxy 140 has already terminated the connection without knowledge of the application and/or the connection manager 106, the database proxy 140 transmits an end-of-stream (EOS) indication as a response. It will be appreciated that the database proxy 140 may be a separate hardware device as illustrated in FIG. 1. In other embodiments, the database proxy 140 may be included in the service provider system 102 as a module, a device, or a software component.

According to certain embodiments, the stale connection module 108 of the connection manager 106 is configured to monitor responses from the database proxy 140 for EOS indications. For every connection request to use a connection from the connection pool 104, the stale connection module 108 is configured to store metadata associated with the connection, metadata associated with the digital transaction, and/or any other type of metadata in a temporary connection buffer.

Under normal operation (e.g., no connection failures and/or any EOS indications transmitted by the database proxy 140), once communication with the database system 102 is completed, the connection buffer is discarded. In instances where a connection fails due to reasons other than an EOS indication, an error message is provided to the application. However, if the stale connection module 108 detects an EOS response from the database proxy 140, the steal connection module 108 notifies the replacement module 110.

The replacement module 110 is configured to modify a physical layer of the connection. As will be described in more detail with respect to FIG. 2, FIG. 3A, and FIG. 3B, the connection may include multiple logical layers and physical layer. The physical layer may indicate a particular server of the database system 130 with which to communicate. As such, the replacement module 110 modifies the physical layer of the connection to point to a different server. The multiple logical layers of the connection are maintained and remain unmodified.

Subsequently, the replay module 112 is accesses the connection buffer and the metadata store therein. According to certain embodiments, the replay module 112 is configured to "replay" the contents of the connection buffer. That is, the replay module 112 causes the database system 130 to perform certain operations based on the metadata stored in the connection buffer.

After replaying the contents of the connection buffer, the connection manager 106 is configured to resend the connection request to use the connection (which has now been modified to point to a different server) to the database proxy 140. The database proxy 140 performs, or causes to be performed, the appropriate database operation with respect to the database system 130 and provides the results of the database operations to the application.

The data storage 114 stores various information that the applications 122 connect to the service provider system 102 to access. The data storage 114 may include any type of storage medium, as described in more detail with reference to the storage 612 in FIG. 6.

The communication component 116 may be configured to communicate with various other devices, such as the other computer(s) 120 and/or other devices. In various embodiments, communication component 116 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/or the like.

It will be appreciated that the database system 130 may include, for example, identifiers (IDs) such as operating system registry entries, cookies associated with a digital wallet application 104 and/or other applications 106, IDs associated with hardware of the communication component 110, IDs used for payment/user/device authentication or identification, and/or other appropriate IDs. Further, the database system 130 may store login credentials (e.g., such as to login to an account with the service provider and/or other accounts with other service providers), identification information, biometric information, and/or authentication information of the user FIG. 1 further illustrates the other computer(s) 120, each of which includes applications 122, database 126, and communication component 128. As previously discussed, the applications 120 may be any type of application that access the service provider system 102. According to a particular embodiment, the applications are applications for backend server systems maintained by a service provider. The applications are configured that access data stored in the service provider system 102 in response to various requests by different components of the backend server systems. In other implementations, the applications 122 are user applications that interact with users of the service provider.

The network 150 may be implemented as a single network or a combination of multiple networks. For example, in various embodiments, the network 150 may include the Internet or one or more intranets, landline networks, wireless networks, and/or other appropriate types of networks. Thus, the network 150 may correspond to small scale communication networks, such as a private or local area network, or a larger scale network, such as a wide area network or the Internet, accessible by the various components of system 100.

Figure 2:
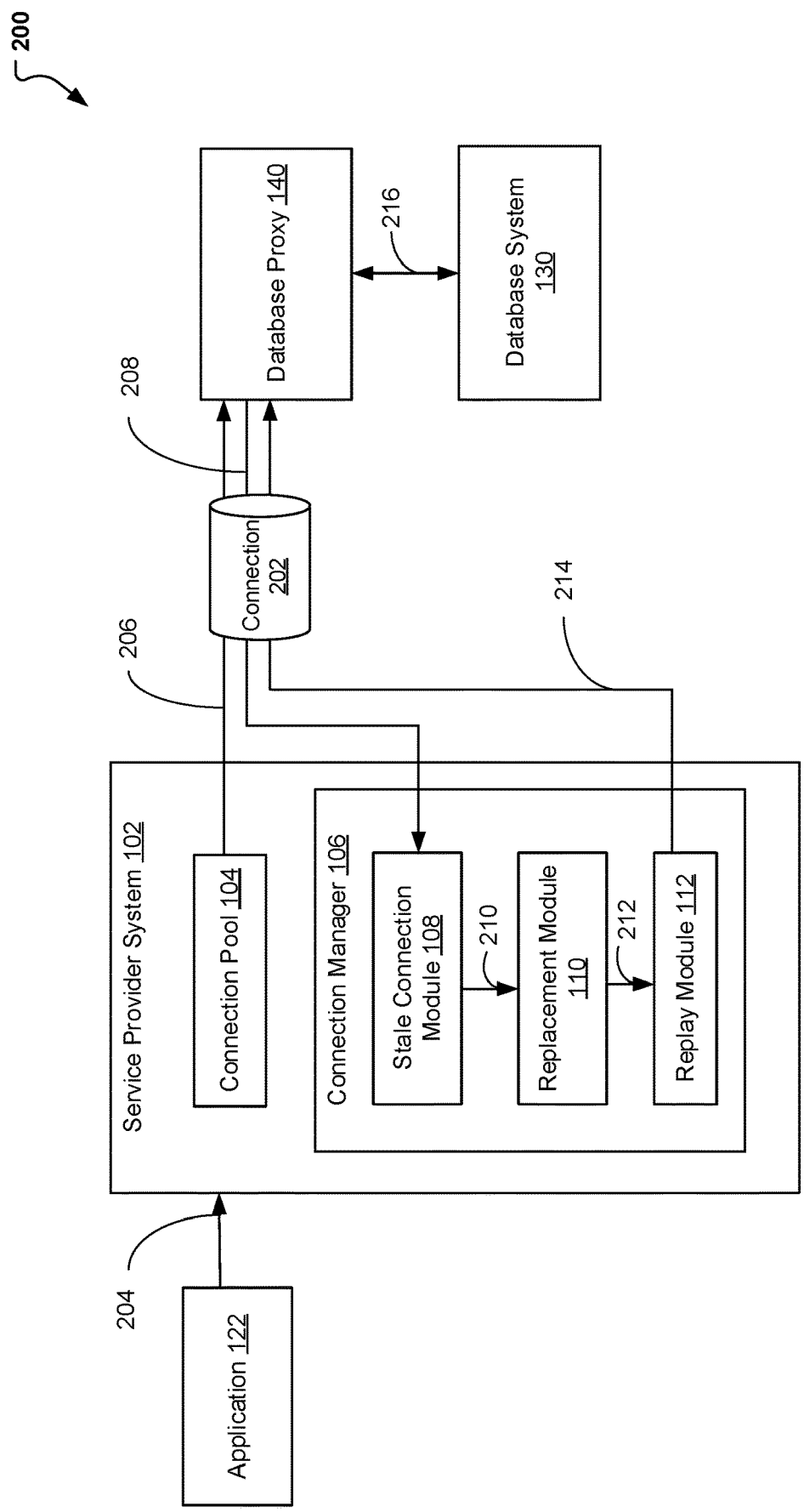
FIG. 2 is a diagram illustrating a data flow for managing stale connections in a distributed system, according to some embodiments.

FIG. 2 illustrates a data flow diagram 200 for managing stale connections in a distributed system in accordance with another particular embodiment. Portions of FIG. 1 are described in conjunction with FIG. 3A, FIG. 3B, and FIG. 4. As shown in FIG. 2, application 122 of other computer(s) 120 may communicate, at step 204, with service provider system 102. For instance, the communication may be part of a digital transaction being conducted between the application 122 and the service provider system 102. As such, the communication may cause the service provider system 102 to generate a connection request for a connection 202 to access the database system 130. To this end, at step 206, a connection request for connection 202 is transmitted to database proxy 140.

Figure 3A:
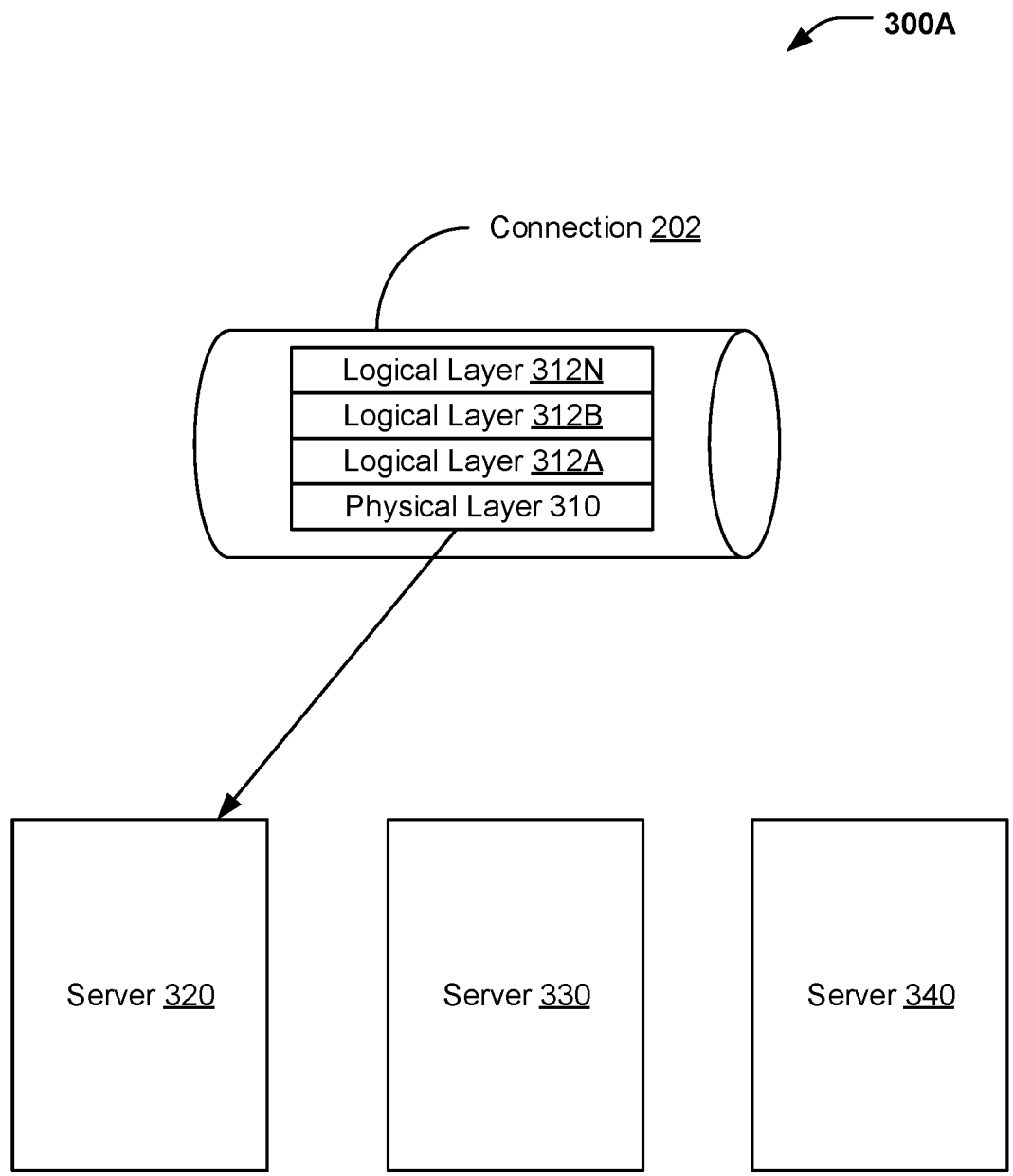
FIG. 3A is a diagram illustrating different layers of a connection, according to some embodiments.

Referring now to FIG. 3A, connection 202 is depicted as including multiple logical layers (e.g., logical layer A, logical layer, B, and logical layer N). Additionally, connection 202 also includes physical layer 310. According to a particular embodiment, logical layers A-N are software objects generated by the application 122 as a result of initiating the connection request. The logical layers A-N may store various information related to digital transaction, the connection, and/or any other aspects associated with communication between the application 122 and the service provider system 102. For example, logical layer A may store state information associated with the digital transaction, such as the current phase of the digital transaction (e.g., initial phase, login phase, payment phase, completion phase, etc.). As another example, logical layer B may correspond to a kernel layer and may store state information and other information related to the kernel of an operating system of the service provider system and/or database system 130. As yet another example, logical layer N may store information associated with the database system 130, such as database sharding information and/or the like.

The physical layer 310 may correspond to a network socket connection. As such, the physical layer 310 may point to a particular socket and/or server of the database system 130, which may include server 320, server 330, and server 340, according to some embodiments. That is, physical layer 310 may indicate an Internet Protocol (IP) address, port number, and/or any other network identifier associated with the appropriate server so that a physical connection with the database system 130 may be established. As depicted in FIG. 3A, physical layer 310 points to server 320 of the database system 130.

Figure 4:
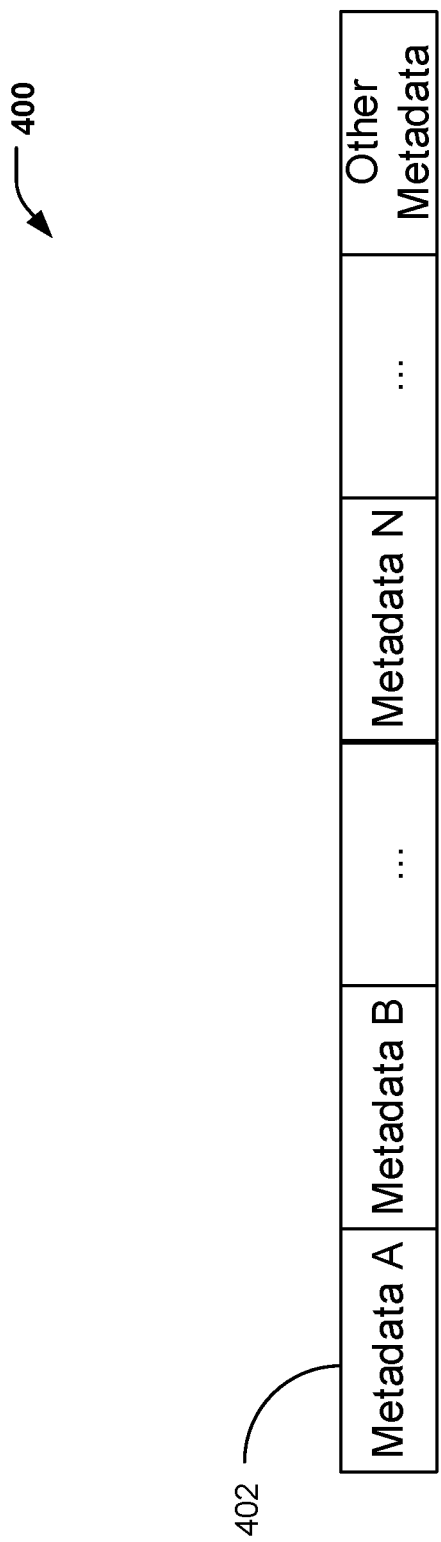
FIG. 4 is a diagram illustrating a connection buffer, according to some embodiments.

Referring again to FIG. 2, at step 206, in addition to the connection request being transmitted, the state connection module 108 is also configured to store information associated with the logical layers A-N of the connection 202 in a connection buffer. For example, FIG. 4 depicts a connection buffer 402 in accordance with a particular embodiment. The connection buffer 402 stores metadata A, metadata B, metadata N, and other metadata. Metadata A may be associated with logical layer A, metadata B may be associated with logical layer B, and metadata N may be associated with logical layer N. As such, metadata A-N may include data that describes the information stored by logical layers A-N. In certain implementations, metadata A-N may include the actual information stored by the logical layers A-N or a portion thereof. For instance, in the previously discussed example in which logical layer A stores state information about the digital transaction, metadata A may store data that describes the state information, the actual state information, or a portion of the state information.

Figure 3B:
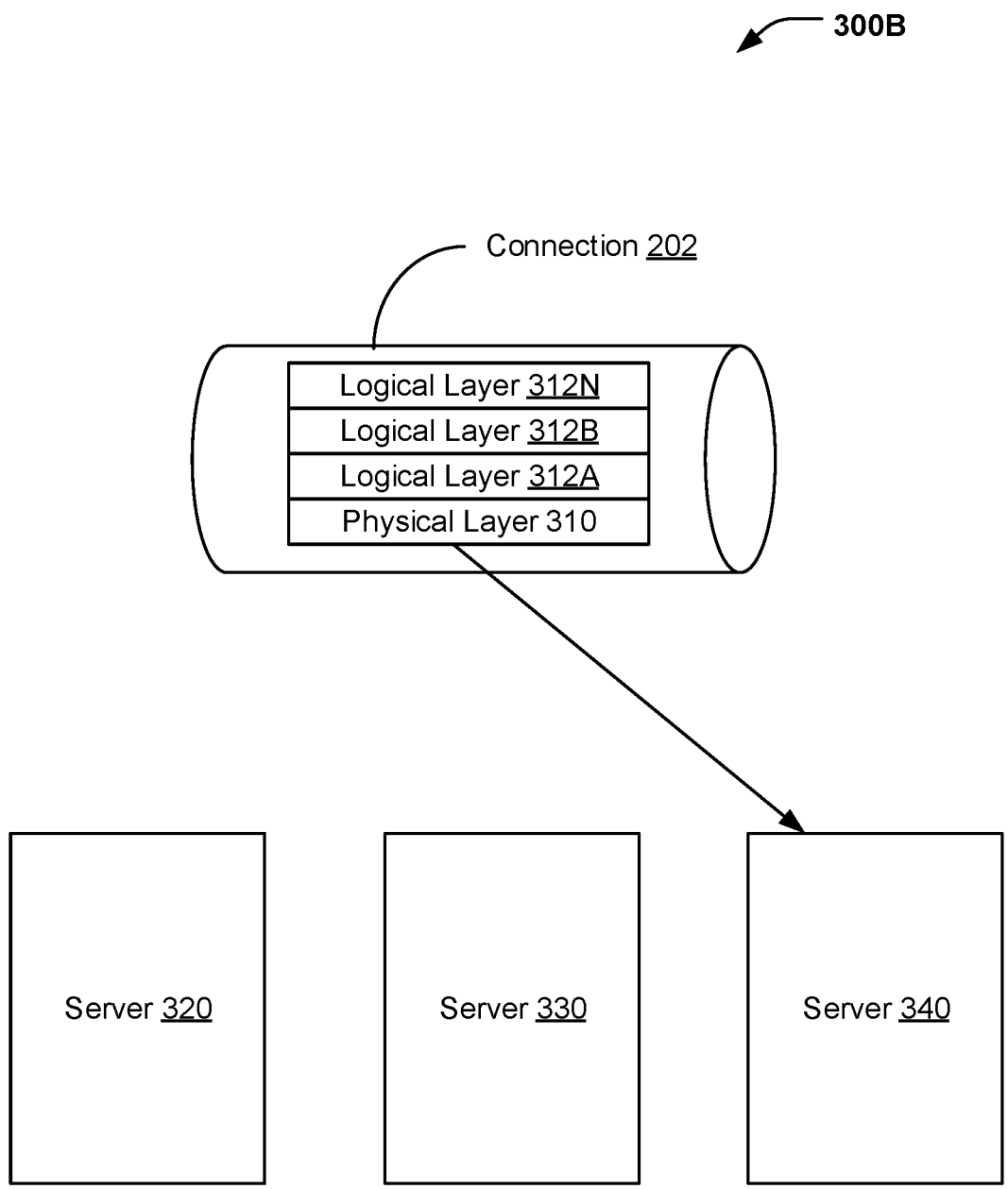
FIG. 3B is a diagram illustrating changes to one or more layers of the connection in FIG. 3A, according to some embodiments

Referring back again to FIG. 2, at step 208, the database proxy 140 responds to the connection request with an EOS indication. The state connection module 108 receives and/or otherwise detects the EOS indication and provides the EOS indication to the replacement module 110 at step 210. At step 212, the replacement module 110 is configured to modify the physical layer of the connection 202 to point to a different server or device that is active and properly functioning. For instance, as shown in FIG. 3B, the replacement module 110 modifies physical layer 310 of the connection 202 to point to server 340 instead server 320. In other words, the physical layer 310 is changed from indicating the network socket corresponding to server 320 (which may have been malfunctioning) to indicating the network socket corresponding to server 340 (which may be properly functioning). According to a particular embodiment, the physical layer 310 is modified, and the logical layer 312 A-N are not modified.

Subsequent to the replacement module 110 modifying the physical layer 310 of the connection 202, the replay module 112 is configured to resend the connection request for the connection 202 to the database proxy 140. The resending of the connection request further causes the database system 130 to perform one or more operations based on the metadata stored in the connection buffer 402 of the connection 202. The operations cause the components of the database system 130 (e.g., such as serve 340) to change to a state indicated by the metadata, such as notifying particular servers of the connection request, logging one or more events, loading certain software libraries, invoking security protocols and software routines, designating particular shards from which to retrieve information, and/or the like.

Using the modified connection 202, the database proxy 140 performs, or causes to be performed, one or more database operations with respect to the database system 130 at step 216. The result of the database operations is subsequently transmitted to the application. Thus, digital transaction failures due to EOS indications to connection requests can be prevented using the framework described in FIG. 2. Additionally, the logical layers 312 A-N are maintained and remain unmodified, which may facilitate compatibility with different types of database proxies. For example, compatibility errors can result if instead of modifying the connection 202, an entirely new connection is generated, and its logical layers are rebuilt. Moreover, the connection manager 106 does not retransmit connection requests that do not result in EOS indications from the database proxy 140 (as it does for connection requests to due result in EOS indications), thereby preserving computing resources as it does not need to perform the resending in every instance.

Figure 5:
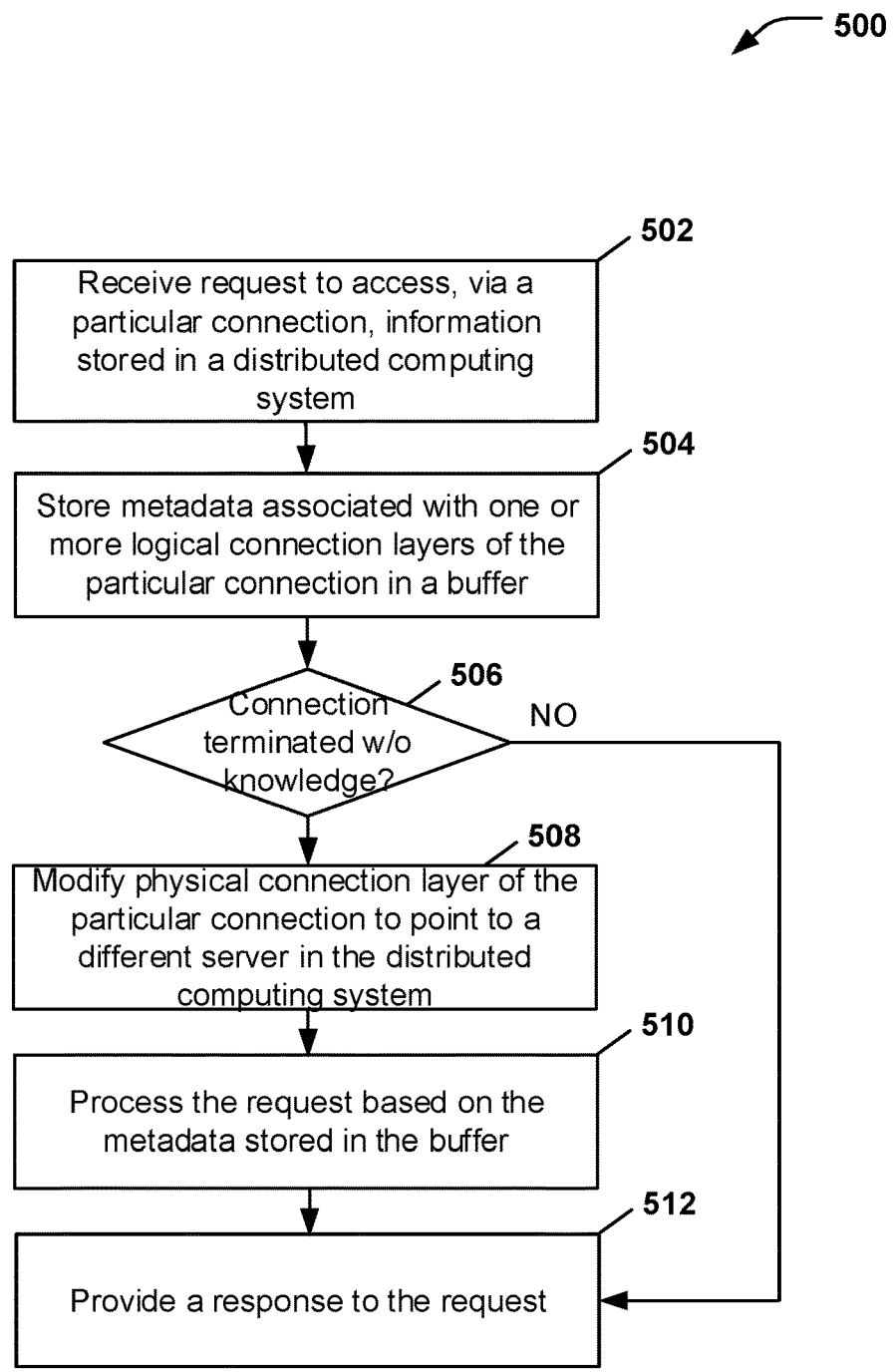
FIG. 5 illustrates a flow diagram illustrating a method for managing stale connections in a distributed system, according to some embodiments.

FIG. 5 illustrates an example flow diagram of a method 400 for managing stale connections in a distributed system, according to one or more particular embodiments. The method 500 may be performed by a connection manager, such as the connection manager 106 of the service provider system 102. The method begins at step 502, where the connection manager receives a request to access, via a particular connection from a connection pool, information stored in a distributed computing system (e.g., database system 130). This request may be transmitted by an application, such as application 122 of user computer 120.

At step 504, the connection manager stores metadata associated with one or more logical connection layers of the particular connection in a connection buffer. At step 506, the connection manger determines whether the connection has previously been terminated without knowledge of the application and/or the connection manager, such as by a database proxy that manages access to the distributed system. If the connection has not been previously terminated, the method 500 proceeds to step 512, where a response to the request (e.g., information retrieval from a database system and/or results from other database operations) is provided.

At step 508, if the connection has been previously terminated, the connection manager modifies the physical connection layer of the connection to point to a different server or device in the distributed computing system. At step 510, the connection manager causes the request to be processed based on the metadata stored in the connection buffer (e.g., processed by the database proxy, the database/distributed system, and/or a combination thereof). At step 512, a response to the request is provided.

Example Computing Device

Figure 6:
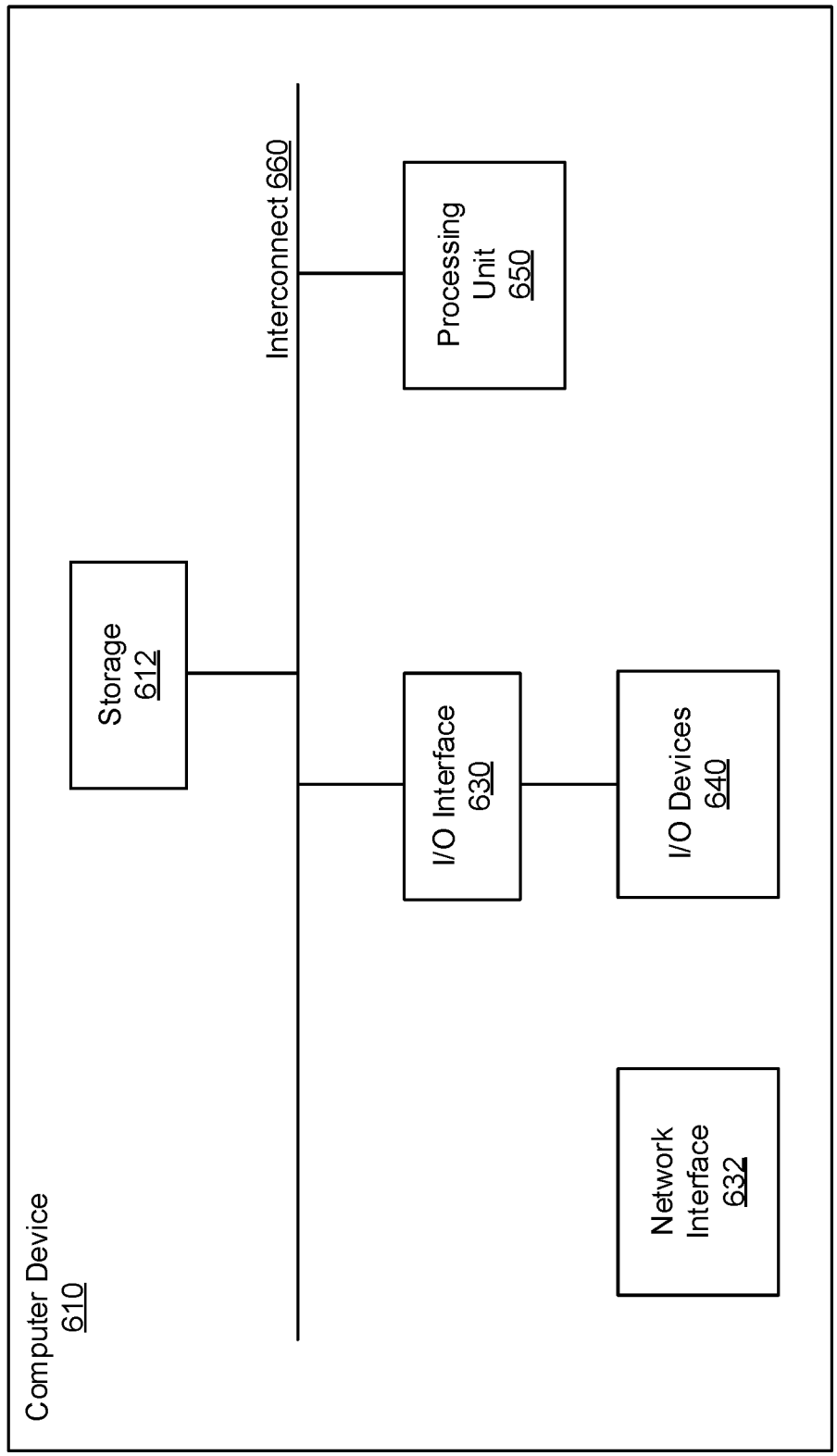
FIG. 6 is a block diagram illustrating an exemplary computing device, according to some embodiments.

Turning now to FIG. 6, a block diagram of one embodiment of computing device (which may also be referred to as a computing system) 610 is depicted. Computing device 610 may be used to implement various portions of this disclosure including any of the components illustrated in FIG. 1 and FIG. 2. Computing device 610 may be any suitable type of device, including, but not limited to, a personal computer system, desktop computer, laptop or notebook computer, mainframe computer system, web server, workstation, or network computer. As shown, computing device 610 includes processing unit 650, storage 612, and input/output (I/O) interface 630 coupled via an interconnect 660 (e.g., a system bus). I/O interface 630 may be coupled to one or more I/O devices 640. Computing device 610 further includes network interface 632, which may be coupled to network 620 for communications with, for example, other computing devices.

In various embodiments, processing unit 650 includes one or more processors. In some embodiments, processing unit 650 includes one or more coprocessor units. In some embodiments, multiple instances of processing unit 650 may be coupled to interconnect 660. Processing unit 650 (or each processor within 650) may contain a cache or other form of on-board memory. In some embodiments, processing unit 650 may be implemented as a general-purpose processing unit, and in other embodiments it may be implemented as a special purpose processing unit (e.g., an ASIC). In general, computing device 610 is not limited to any particular type of processing unit or processor subsystem.

Storage subsystem 612 is usable by processing unit 650 (e.g., to store instructions executable by and data used by processing unit 650). Storage subsystem 612 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 612 may consist solely of volatile memory, in one embodiment. Storage subsystem 612 may store program instructions executable by computing device 610 using processing unit 650, including program instructions executable to cause computing device 610 to implement the various techniques disclosed herein.

I/O interface 630 may represent one or more interfaces and may be any of various types of interfaces configured to couple to and communicate with other devices, according to various embodiments. In one embodiment, I/O interface 630 is a bridge chip from a front-side to one or more back-side buses. I/O interface 630 may be coupled to one or more I/O devices 640 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
one or more hardware processors; and
a memory storing computer-executable instructions, that in response to execution by the one or more hardware processors, causes the system to perform operations comprising:
receiving a database request to access, via a first connection in a connection pool, information stored in a database of the system, the first connection being associated with a physical connection layer and one or more logical connection layers, wherein the physical connection layer points to a first network socket;
storing metadata associated with the one or more logical connection layers in a buffer;
responsive to determining that the first connection has been terminated and while maintaining the one or more logical layers, modifying the physical connection layer to point to a second network socket that is different from the first network socket;
subsequent to the modifying, processing the database request via the first connection based on the metadata stored in the buffer;
providing a response to the database request;
receiving a second database request to access information stored in the database via a second connection in the connection pool;
storing second metadata associated with the second connection in a buffer;
determining that the second connection is an active connection; and
responsive to the determining that the second connection is an active connection, providing a response to the second database request.

2. The system of claim 1, wherein the database request is included in a processing of a digital transaction, and wherein the one or more logical layers store at least one of state information associated with the digital transaction or sharding information associated with the database.

3. The system of claim 1, wherein the first network socket corresponds to a first database server, and the second network socket corresponds to a second database server.

4. The system of claim 3, wherein the processing the database request further comprises:
causing one or more operations corresponding to the metadata to be performed with respect to the second database server.

5. The system of claim 1, wherein the buffer is generated in the physical connection layer.

6. The system of claim 1, wherein the one or more logical layers correspond to one or more class objects of a programming language.

7. The system of claim 1, wherein the determining that the first connection has been terminated further comprises:
receiving an end-of-stream indication from a device corresponding to the first network socket.

8. The system of claim 1, wherein the operations further comprise:
receiving a third database request to access information stored in the database via a third connection in the connection pool;
storing third metadata associated with the third connection in a buffer;
determining that the third connection has failed; and
responsive to the determining that the third connection has failed, transmitting an indication that a digital transaction associated with the third database request has failed.

9. The system of claim 1, wherein the first network socket or the second network socket comprises an Internet Protocol address, a port number, or a networking identifier.

10. A method, comprising:
receiving a request to access, via a first connection in a connection pool, information stored in a distributed computing system, the first connection indicating a socket connection with a first server of the distributed computing system;
storing metadata associated with the first connection in a temporary buffer;
responsive to determining that the first connection has been closed, modifying the first connection to indicate a new socket connection with a second server of the distributed computing system, wherein the modifying is performed without modifying one or more logical connection layers associated with the first connection;
subsequent to the modifying the first connection to indicate the new socket connection with the second server, processing the request via the first connection based on the metadata stored in the temporary buffer;
receiving a second request to access, via a second connection in the connection pool, information stored in the distributed computing system;
determining that the second connection has failed without receiving an end-of-stream indication; and
responsive to the determining that the second connection has failed without receiving an end-of-stream indication, transmitting an indication that a digital transaction associated with the second request has failed.

11. The method of claim 10, further comprising:
receiving a third request to access, via a third connection in the connection pool, information stored in the distributed computing system;
determining that the third connection is an active connection that has not failed; and
responsive to the determining that the third connection is an active connection that has not failed, providing a response to the second request.

12. The method of claim 10, wherein the request corresponds to a payment processing transaction.

13. The method of claim 12, wherein the one or more logical layers associated with the first connection store state information associated with the payment processing transaction.

14. The method of claim 10, wherein the determining that the first connection has been closed further comprises:
receiving the end-of-stream indication by at least one of the first server of the distributed computing system or a database proxy in communication with the first server of the distributed computing system.

15. The method of claim 10, wherein the processing the request via the first connection based on the metadata stored in the temporary buffer further comprises:
causing the first server of the distributed computing system to perform one or more operations indicated by the metadata stored in the temporary buffer; and
transmitting a response, to the request to access the information, based on an output of the one or more operations performed by the first server.

16. The method of claim 10, wherein the socket connection or the new socket connection comprises an Internet Protocol address, a port number, or a networking identifier.

17. A non-transitory computer readable medium storing computer-executable instructions that in response to execution by one or more hardware processors, causes a database system to perform operations comprising:
receiving a request to access, via a first connection in a connection pool, information stored in the database system, the first connection indicating a socket connection with a first server of the database system;
accessing metadata associated with the first connection in a temporary buffer;
responsive to determining that the first connection has been closed, modifying the first connection to indicate a new socket connection with a second server of the database system, wherein the modifying is performed without modifying one or more logical connection layers associated with the first connection;
subsequent to the modifying the first connection to indicate the new socket connection with the second server, processing the request via the first connection based on the metadata accessed in the temporary buffer;
receiving a second request to access, via a second connection in the connection pool, information stored in the database system;
determining that the second connection has failed without receiving an end-of-stream indication; and
responsive to the determining that the second connection has failed without receiving an end-of-stream indication, transmitting an indication that a digital transaction associated with the second request has failed.

18. The non-transitory computer readable medium of claim 17, wherein the operations further comprise:
receiving a third request to access, via a third connection in the connection pool, information stored in the database system;
determining that the third connection is an active connection that has not failed; and
responsive to the determining that the third connection is an active connection that has not failed, providing a response to the third request.

19. The non-transitory computer readable medium of claim 18, wherein the determining that the first connection has been closed further comprises:

receiving the end-of-stream indication by at least one of the first server of the database system or a database proxy in communication with the first server of the database system.

20. The non-transitory computer readable medium of claim 17, wherein the socket connection or the new socket connection comprises an Internet Protocol address, a port number, or a networking identifier.

* * * * *